United States Patent [19]
Dragotta

[11] Patent Number: 6,161,568
[45] Date of Patent: Dec. 19, 2000

[54] WATER SUPPLY PIPE PROTECTOR

[76] Inventor: Kenneth J. Dragotta, N76 W29220 Hwy. VV, Hartland, Wis. 53029

[21] Appl. No.: 09/417,501

[22] Filed: Oct. 13, 1999

[51] Int. Cl.[7] ...................................................... F16L 5/00
[52] U.S. Cl. .......................... 137/359; 137/148; 137/375; 138/96 R; 138/109; 138/114; 138/148; 4/17; 4/675
[58] Field of Search .................................... 137/375, 359, 137/148; 138/148, 114, 109, 96 R; 4/17, 675

[56] References Cited

U.S. PATENT DOCUMENTS

| | | |
|---|---|---|
| 569,790 | 10/1896 | Loring . |
| 1,779,499 | 10/1930 | Sellers . |
| 3,928,903 | 12/1975 | Richardson et al. .................. 29/407.1 |
| 4,185,463 | 1/1980 | Tanahashi et al. ...................... 60/322 |
| 4,619,292 | 10/1986 | Harwood ................................. 138/113 |
| 4,667,505 | 5/1987 | Sharp .................................. 73/40.5 R |
| 5,253,680 | 10/1993 | Matsumoto ............................ 138/148 |
| 5,277,220 | 1/1994 | Thul ....................................... 137/359 |
| 5,540,255 | 7/1996 | Trueb et al. ............................ 137/375 |
| 5,588,681 | 12/1996 | Parks ........................................ 285/46 |
| 5,603,347 | 2/1997 | Eaton ..................................... 137/360 |
| 5,685,328 | 11/1997 | Helmsderfer ............................ 137/15 |
| 5,697,393 | 12/1997 | Mirlisena, Sr. ........................... 137/15 |
| 5,934,316 | 8/1999 | Helmsderfer ............................ 137/375 |

*Primary Examiner*—A. Michael Chambers
*Assistant Examiner*—Thomas L. McShane
*Attorney, Agent, or Firm*—Andrus, Sceales, Starke & Sawall, LLP

[57] ABSTRACT

A decorative pipe protector that can be positioned around a copper water supply pipe to both provide a decorative appearance and protect the copper water supply pipe from corrosion. The pipe protector includes a trim tube extending axially between a first end and a second end. The trim tube includes an inner surface having an inner diameter slightly larger than the outer diameter of the water supply pipe such that the trim tube can be slid onto the water supply pipe. The second end of the trim tube includes an attachment portion formed along its inner surface having a reduced diameter approximately equal to the outer diameter of the water supply pipe. The attachment portion of the trim tube is sweat soldered to the outer diameter of the water supply pipe to provide a liquid-tight seal between the two components. The second end of the trim tube includes external threads that receive a water shut-off valve. The outer surface of the trim tube includes a protective coating formed along the entire length of the trim tube from the first end to the second end. The protective coating provides a visually appealing appearance and protects the underlying trim tube from corrosion.

13 Claims, 2 Drawing Sheets

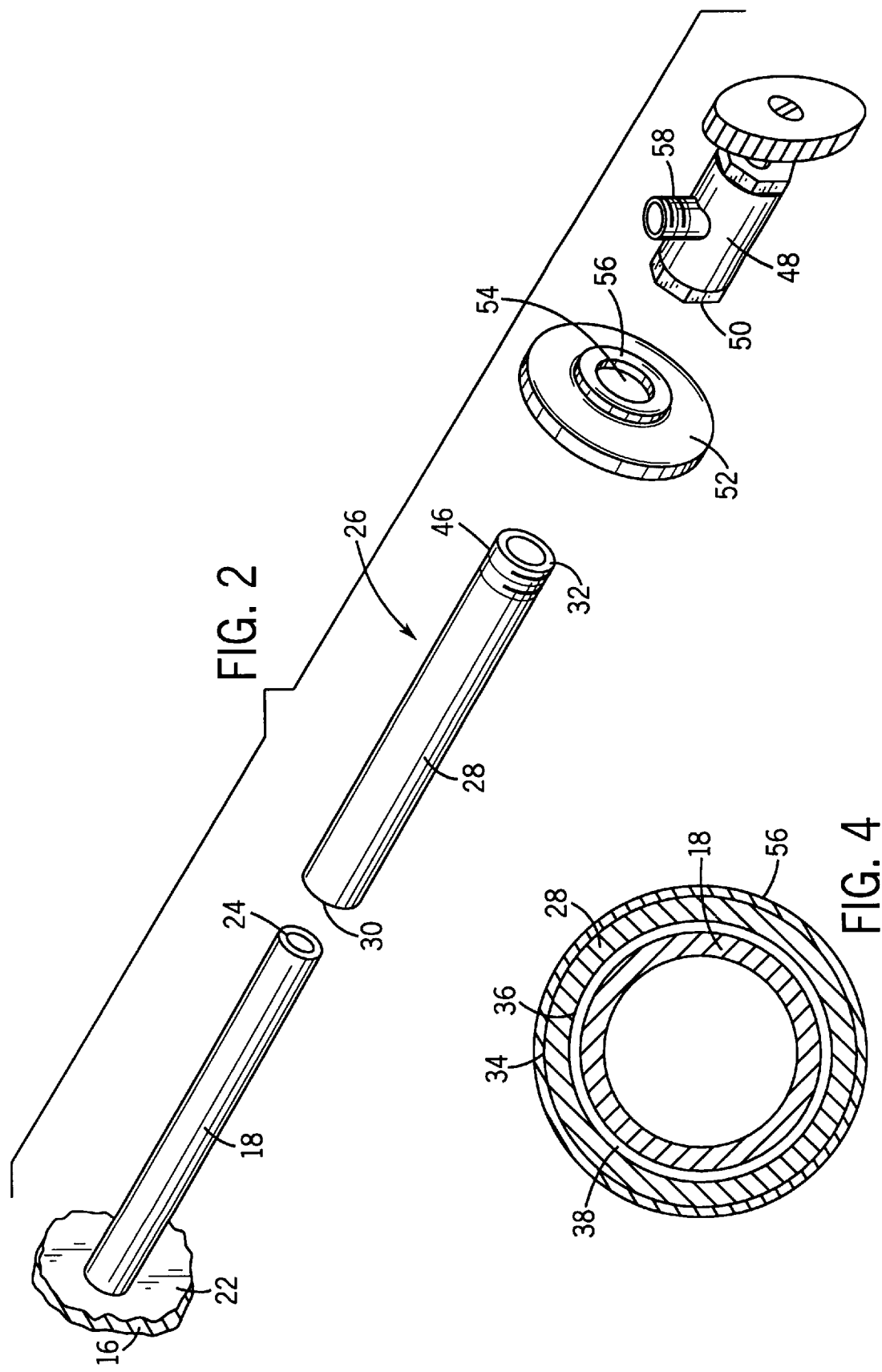

WATER SUPPLY PIPE PROTECTOR

BACKGROUND OF THE INVENTION

The present invention generally relates to a method and apparatus for providing a decorative appearance for a copper water supply pipe extending from the wall of a bathroom. More specifically, the present invention relates to a decorative trim tube that can be slid over the water supply pipe and securely attached to the water supply pipe to both protect the water supply pipe from corrosion and provide an aesthetically pleasing decorative appearance for the water supply pipe.

In new home constructions, the water supply pipes for bathroom fixtures typically extend approximately four to six inches from either the bathroom wall or the bathroom floor. The water supply pipes are typically located behind the bathroom fixtures about six to twelve inches above the floor level. Typically, the water supply pipe extending from the bathroom wall or floor is connected to the main water line behind the bathroom wall or floor surface.

After the bathroom has been constructed, bathroom fixtures, such as a toilet or sink, are installed in the desired location and a shut-off valve is attached to the water supply pipe extending from the wall. Typically, the shut-off valve includes a threaded outlet that receives a flexible conduit that is connected to the bathroom fixture to supply water to the fixture. The flexible conduit allows the builder to have increased flexibility in the placement of the bathroom fixtures by increasing building tolerances during construction of the bathroom.

While the above-identified method of supplying water to a bathroom fixture has proven to be effective and convenient for modern builders, the approximately six inch section of unfinished copper water supply pipe extending from the wall or floor of the bathroom is considered by some to be unattractive. Additionally, after years of use, the copper water supply pipe can become corroded, further decreasing its attractiveness. Finally, unfinished copper piping is difficult to clean and disinfect, which may present problems in an otherwise sanitary bathroom environment.

One method of eliminating the length of copper water supply pipe extending from the wall of the bathroom is to cut off the copper water supply pipe near the wall of the bathroom and attach the water shut-off valve very close to the wall of the bathroom. Although this method improves the appearance of the water supply pipe, it requires the builder to perform the finish work of trimming and affixing the water shut-off valve close to the wall. Additionally, this method significantly decreases the tolerance between the position of the bathroom fixture and the position of the water supply pipe and causes a decrease in sanitary conditions due to the inaccessibility of all surfaces for cleaning.

Therefore, it is an object of the present invention to provide a decorative pipe protector that can be placed over the copper water supply pipe extending from the wall in a bathroom. It is an additional object of the invention to provide a pipe protector that includes a durable outer, protective coating that can be repeatedly cleaned and sanitized. It is an additional object of the present invention to provide a pipe protector having a trim tube coated with a durable material, such as chrome. Further, it is an object of the invention to provide a trim tube that can be easily positioned on the copper water supply pipe to provide an aesthetically pleasing appearance for the water supply pipe. Additionally, it is an object of the present invention to provide a liquid-tight connection between the water supply pipe and the trim tube. It is an additional object of the present invention to provide a trim tube having an externally threaded portion that allows a shut-off valve to be easily attached to the trim tube.

SUMMARY OF THE INVENTION

The present invention is a decorative pipe protector that can be positioned over a copper water supply pipe to provide an aesthetically pleasing appearance for the water supply pipe and prevent corrosion to the copper water supply pipe. The pipe protector of the present invention includes a trim tube extending axially between a first end and a second end. The inner surface of the trim tube has an inner diameter that is slightly larger than the exterior diameter of the water supply pipe which allows the trim tube to be slid onto the water supply pipe. The difference between the exterior diameter of the water supply pipe and the inner diameter of the trim tube provides a clearance gap that allows the trim tube to be slid onto the water supply pipe even if the water supply pipe includes a slight bend. In addition to creating clearance to allow the trim tube to be installed, the difference between the exterior diameter of the water supply pipe and the inner diameter of the trim tube creates an insulating air gap that reduces condensation on the trim tube.

The trim tube includes a protective coating formed along the entire outer surface of the trim tube. The protective coating protects the underlying copper trim tube and creates an aesthetically pleasing appearance for the trim tube.

The second end of the trim tube includes an attachment portion formed along the inner surface of the trim tube. The attachment portion has a reduced inner diameter that is approximately equal to the outer diameter of the water supply pipe. The inner surface of the attachment portion frictionally receives the outer diameter of the water supply pipe and provides a point at which the trim tube can be sweat soldered to the water supply pipe.

The outer surface of the trim tube near the second end includes external threads that threadedly receive a water shut-off valve. The external threads formed on the second end of trim tube engage the shut-off valve and provide a liquid-tight seal between the trim tube and the water shut-off valve.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is an exploded perspective view of the pipe protector of the present invention showing its positioning over the copper water supply pipe;

FIG. 4 is a section view taken along line 4—4 of FIG. 3.

DETAILED DESCRIPTION OF THE INVENTION

Figure 1:
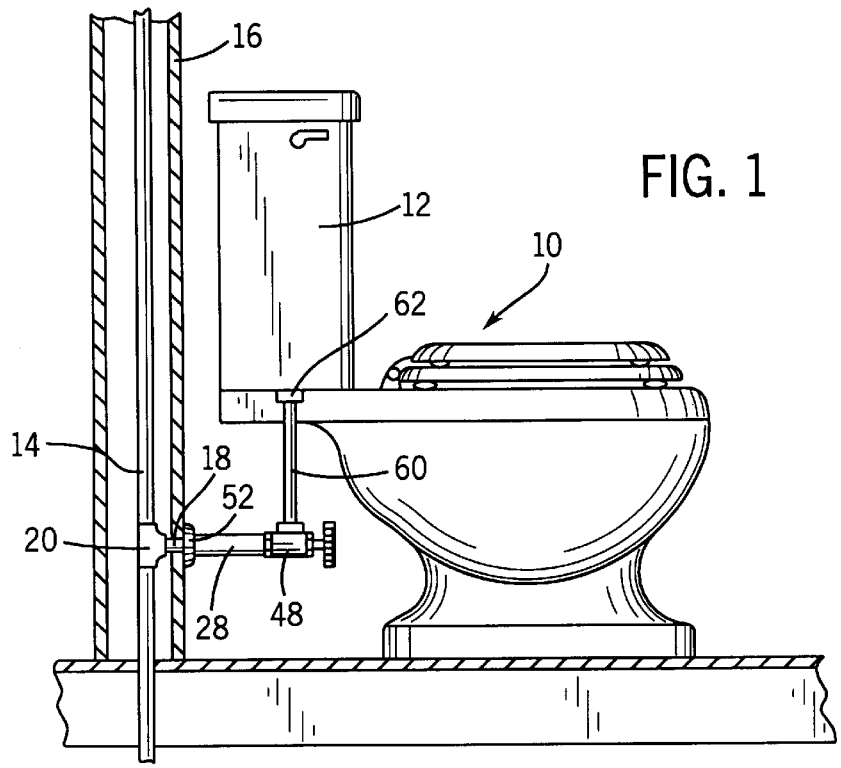
FIG. 1 is a side elevation view of a pipe protector of the present invention installed on a copper water supply pipe for a toilet.

A conventional bathroom fixture, such as toilet 10, is shown in FIG. 1. The toilet 10 includes a holding tank 12 that receives a supply of water from water pipes passing through the walls and floors of the building in which the toilet 10 is located. As shown in FIG. 1, the tank 12 is connected to the main water pipe 14 that passes vertically through a bathroom wall 16 located near the toilet 10. Specifically, a water supply pipe 18 passes through the bathroom wall 16 and is connected to the main water pipe 14 by a T-connector 20.

Figure 3:
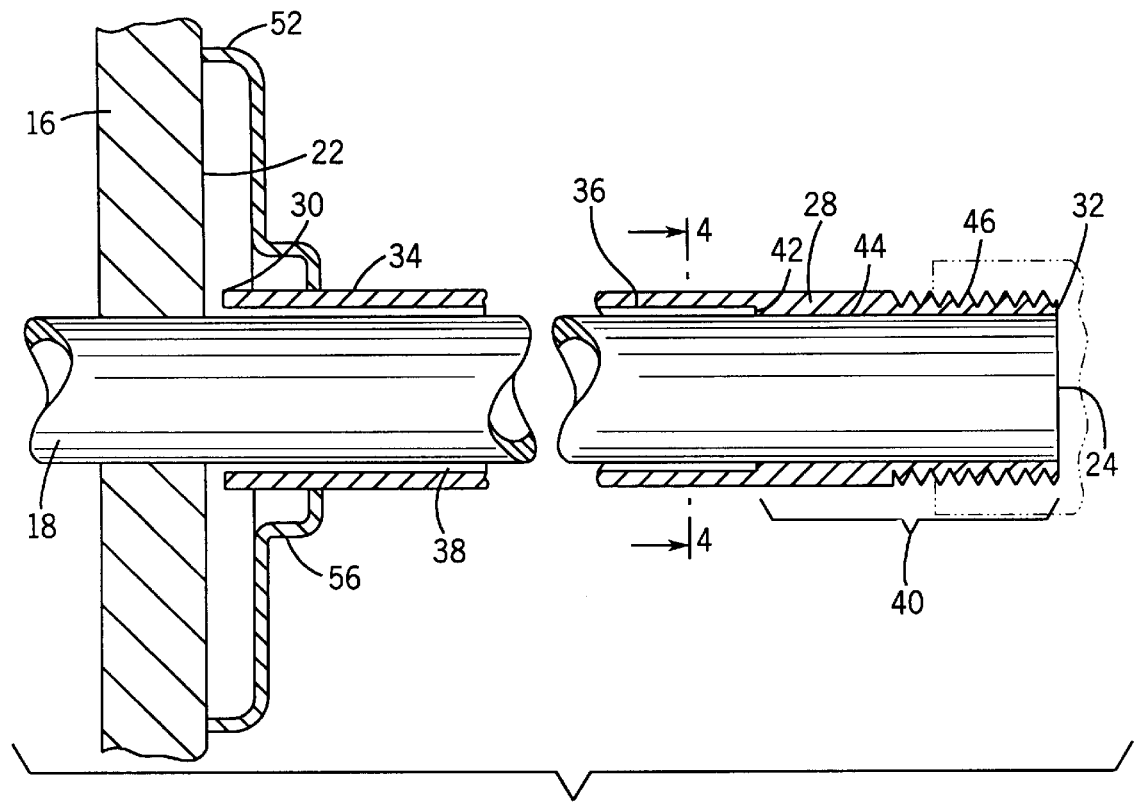
FIG. 3 is a partial section view illustrating the operative position of the pipe protector of the present invention.

As can be seen in FIG. 3, the water supply pipe 18 passes through the bathroom wall 16 and extends from the face surface 22 of the bathroom wall 16. Typically, the water supply pipe 18 extends approximately four to six inches from face surface 22 of the bathroom wall 16 and terminate at a discharge end 24, as shown in FIGS. 2 and 3. In many modern bathrooms, the water supply pipe 18 is a copper pipe having an outer diameter of approximately ⅝ of an inch. Although the water supply pipe 18 typically extends four to six inches from the face surface 22 of the bathroom wall 16, the specific length of the water supply pipe 18 from the face surface 22 to the discharge end 24 is irrelevant, as will be discussed in greater detail below.

Referring now to FIG. 2, thereshown is a pipe protector 26 that can be positioned over the length of the water supply pipe 18 extending from the bathroom wall 16 to both protect the water supply pipe 18 and provide an aesthetically pleasing appearance to the length of pipe extending from the face surface 22 of the bathroom wall 16. The pipe protector 26 generally includes a trim tube 28 having an axial length extending between a first end 30 and a second end 32.

As can be seen in FIGS. 3 and 4, the trim tube 28 includes a cylindrical outer surface 34 and a cylindrical inner surface 36 that each extend along the axial length of the trim tube 28. As can best be seen in FIG. 4, the inner surface 36 is defined by an inner diameter that is slightly larger than the outer diameter of the water supply pipe 18. The difference between the inner diameter of the inner surface 36 of the trim tube 28 and the outer diameter of the water supply pipe 18 defines a gap 38 located between the water supply pipe 18 and the trim tube 28. The gap 38 allows the trim tube 28 to be slid smoothly over the outer diameter of the water supply pipe 18. The additional tolerance provided by the gap 38 allows the trim tube 28 to be slid onto the water supply pipe 18 even if the water supply pipe 18 includes small bends or uneven areas. In the preferred embodiment of the invention, the air gap 38 is approximately $\frac{1}{16}^{th}$ of an inch, although slight variations in the air gap 38 are contemplated by the inventor.

In addition to providing clearance between the water supply pipe 18 and the trim tube 28 to facilitate installation, the air gap 38 provides an insulating layer between the cold water in the water supply pipe 18 and the generally warm environment on the exterior of the trim tube 18. The insulation provided by the gap 38 reduces condensation on the water supply pipe 18, especially in warm, humid environments.

Referring now to FIG. 3, the inner surface 36 of the trim tube 28 includes an attachment portion 40 contained near the second end 32. The inner diameter of the attachment portion 40 is approximately equal to the outer diameter of the water supply pipe 18 and is set off from the remaining portion of the inner surface 36 by shoulder 42. The decreased diameter of the attachment portion 40 allows the inner surface 44 of the attachment portion 40 to frictionally engage the outer diameter of the water supply pipe 18.

In the preferred embodiment of the invention, the axial length of the trim tube between the first end 30 and the second end 32 is approximately six inches. If the length of the water supply pipe 18 extending from the face surface 22 of the bathroom wall 16 is less than six inches, the axial length of the trim tube 28 must be modified. The axial length of the trim tube 28 can be changed by removing the required length of the trim tube 28 from the first end 30 of the trim tube 28 in a conventional manner. Once the trim tube 28 has been cut to the required length, the trim tube 28 can be slid over the length of the water supply pipe 18.

As can be seen in FIG. 3, when the trim tube 28 is cut the correct length and installed onto the water supply pipe 18, the second end 32 of the trim tube 28 is aligned with the discharge end 24 of water supply pipe 18. At this time, the first end 30 of the trim tube 28 is spaced slightly from face surface 22 of the bathroom wall 16.

As shown in FIGS. 2 and 3, the second end 32 of the trim tube 28 includes external threads 46 formed along the outer surface 34. The threads 46 are cut into the outer surface 34 in a manner such that they can receive a standard shut-off valve 48. Shut-off valve 48 includes internal, corresponding threads formed in an inlet opening 50 of the shut-off valve 48.

In the preferred embodiment of the invention, the trim tube 28 is sweat soldered to the water supply pipe 18 to form a water-tight seal between the water supply pipe 18 and the trim tube 28. The sweat solder joint is formed between the outer surface of the water supply pipe 18 and the inner surface 44 of the attachment portion 40 of the trim tube 28 and is a conventional joint formed between two coaxial members. As is conventional, the outer surface of the water supply pipe 18 near the discharge end 24 is first roughened by an abrasive material, such as sandpaper, before the trim tube 28 is slid axially along the length of the water supply pipe 18. The roughened surface of the water supply pipe 18 increases the effectiveness of the sweat solder joint between the two components.

Once the trim tube 28 has been slid onto the water supply pipe 18 and sweat soldered in place, an escutcheon plate 52, including central opening 54, is slid axially along the length of the trim tube 28 until the escutcheon plate 52 contacts the face surface 22 of the bathroom wall 16. As shown in FIG. 3, the escutcheon plate 52 includes an extended hub 56 that defines the central opening 54 and shields the first end 30 of the trim tube 28 from view. The escutcheon plate 52 provides an aesthetically pleasing appearance surrounding the hole formed in the bathroom wall 16 through which the water supply pipe 18 extends. In addition, the escutcheon plate 52 shields the first end 30 of the trim tube 28 from view.

Referring now to FIG. 4, the trim tube 28 is formed from copper and includes a protective coating 56 formed along the entire outer surface 34 of the trim tube 28 from the first end 30 to the second end 32, including the threads 46. The protective coating 56 not only protects the copper trim tube 28, but also provides a decorative and aesthetically pleasing appearance for the trim tube 28. In the preferred embodiment of the invention, the protective coating 56 is chrome, although other types of similar decorative coatings, such as nickel or gold, could be utilized.

The protective coating 56 coats the outer surface 34 of the copper trim tube 28 and provides an overall outer surface that resists corrosion and can be effectively cleaned. Additionally, the protective coating 56 preferably can be cleaned with anti-bacterial cleaners to not only clean the protective coating but disinfect the entire outer surface of the trim tube 28. Without the trim tube 28 including the protecting coating 56, the exposed copper water supply pipe 18 could not be effectively cleaned to remove all bacteria and other germs present in a bathroom environment.

Referring to FIGS. 1 and 2, the shut-off valve 48 includes a threaded outlet fitting 58 that receives a flexible supply conduit 60, which in turn is connected to an inlet 62 for the storage tank 12. The flexible conduit 60 allows a plumber or builder to position the toilet 10 within the bathroom without the requirement for specific tolerances between the position of the water supply pipe 18 and the toilet 10, since the flexible conduit 60 can be bent and positioned as desired.

Although the present invention has been discussed as incorporating a copper trim tube 28 having a protective coating 56 of chrome and used on a toilet, it is contemplated by the inventor that other materials could form both the trim tube 28 and the protective coating 56 and the device could have uses for other plumbing fixtures. For example, the trim tube 28 could be formed from aluminum, plastic, or other material that can be suitably attached to the exterior surface of the water supply pipe 18. Likewise, protective coating 56 could be formed from a decorative material other than chrome, such as gold, nickel or other similar material. Regardless of the particular material selected, it is important that protective coating 56 be both aesthetically pleasing and able to protect the underlying trim tube 28 while also presenting a surface that can be effectively cleaned and disinfected.

Various alternatives and embodiments are contemplated as being within the scope of the following claims particularly pointing out and distinctly claiming the subject matter regarded as the invention.

I claim:

1. A pipe protector for a water supply pipe having an outer diameter and extending from a wall and terminating at a discharge end, the pipe protector comprising:
   a trim tube having a first end, a second end, an outer surface having an outer diameter, and an inner surface having an inner diameter, the axial length of the trim tube between the first end and the second end being approximately equal to the length of the water supply pipe extending from the wall, the inner diameter of the trim tube being slightly larger than the outer diameter of the water supply pipe; and
   a protective coating contained on the entire outer surface of the trim tube, the protective coating preventing corrosion to the trim tube;
   wherein the trim tube receives the inlet water supply pipe within its inner surface such that the first end of the trim tube is positioned near the wall and the second end of the trim tube is generally axially aligned with the discharge end of the water supply pipe; and
   wherein the inner surface of the trim tube includes an attachment portion positioned near the second end of the trim tube, the inner diameter of the attachment portion being less than the inner diameter of the trim tube and approximately equal to the outer diameter of the water supply pipe.

2. The pipe protector of claim 1 wherein the trim tube is formed from copper.

3. The pipe protector of claim 2 wherein the protective coating contained on the entire outer surface of the trim tube is chrome.

4. The pipe protector of claim 1 wherein the trim tube is secured to the inlet water supply pipe by a sweat solder joint positioned between the discharge end of the inlet water supply pipe and the attachment portion of the trim tube.

5. The pipe protector of claim 1 wherein the outer surface of the trim tube includes an external threaded portion positioned at the second end of the trim tube, the external threaded portion threadedly receiving a shut-off valve.

6. The pipe protector of claim 1 further comprising an escutcheon plate having an opening sized slightly larger than the outer diameter of the trim tube including the protective coating, wherein the escutcheon plate is slid along the length of the trim tube and positioned in contact with the wall to cover the first end of the trim tube.

7. The pipe protector of claim 1 wherein the length of the trim tube is modified by removing a portion of the trim tube near its first end.

8. The pipe protector of claim 1 further comprising an air gap formed between the water supply pipe and the inner surface of the trim tube, wherein the air gap forms an insulating layer between the water supply pipe and the trim tube.

9. A method of protecting a copper water supply pipe from corrosion while providing a decorative appearance, the method comprising the steps of:
   abrading the outer circumference of the water supply pipe near a discharge end of the water supply pipe;
   providing a trim tube extending between a first end and a second end, the trim tube having an inner surface having an inner diameter and an outer surface having an outer diameter, the trim tube further including an attachment portion positioned at the second end of the trim tube, the inner diameter of the attachment portion being less than the inner diameter of the trim tube and approximately equal to the outer diameter of the water supply pipe;
   forming external threads on the outer surface of the trim tube along the attachment portion formed at the second end of the trim tube;
   applying a protective and decorative coating to the outer surface of the trim tube;
   sliding the trim tube over the water supply pipe until the inner surface of the attachment portion contacts the outer surface of the water supply pipe and the second end of the trim tube is generally aligned with the discharge end of the water supply pipe and the first end of the trim tube is positioned near a wall through which the water supply pipe extends; and
   joining the discharge end of the water supply pipe to the second end of the trim tube.

10. The method of claim 9 wherein the discharge end of the water supply pipe is sweat soldered to the second end of the trim tube.

11. The method of claim 9 further comprising the step of sliding an escutcheon plate along the length of the trim tube including the protective coating until the escutcheon plate is in contact with the wall such that the escutcheon plate shields the outer supply pipe between the first end of the trim tube and the wall.

12. The method of claim 9 wherein the trim tube is formed from copper.

13. The method of claim 12 wherein the protective coating applied to the outer surface of the trim tube is chrome.

* * * * *